July 11, 1950
A. J. MILLER
2,514,583
ADJUSTABLE DAMPER WITH FRICTION HOLDING
MEANS FOR FIREPLACES
Filed July 2, 1945
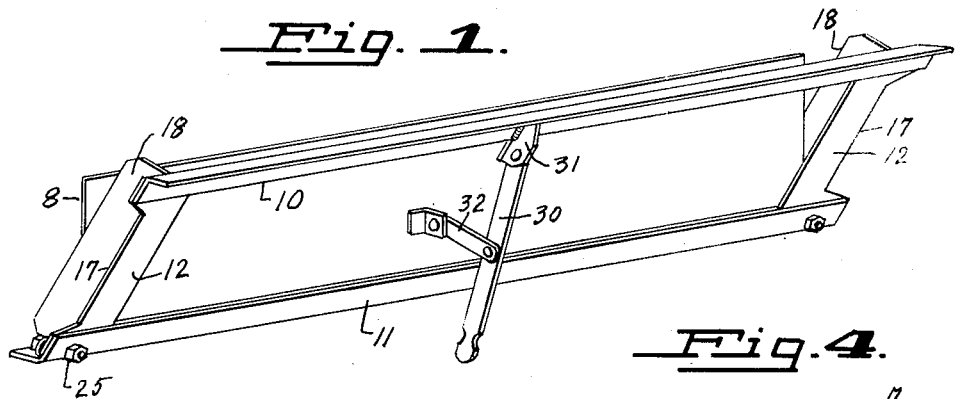
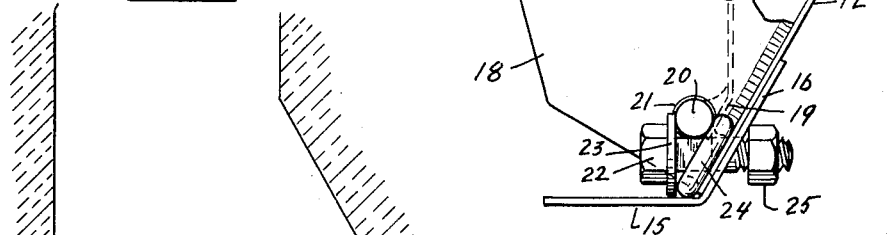
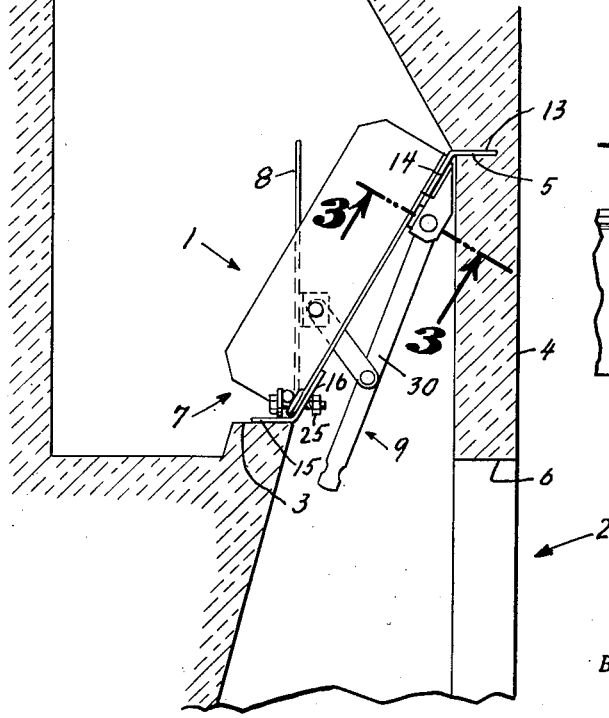
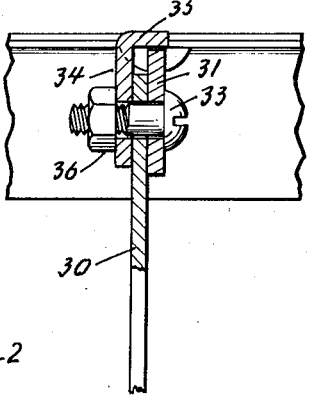
INVENTOR,
AUGUST J. MILLER.
BY
A. Schapp
ATTORNEY.

Patented July 11, 1950

2,514,583

UNITED STATES PATENT OFFICE 2,514,583

ADJUSTABLE DAMPER WITH FRICTION HOLDING MEANS FOR FIREPLACES

August J. Miller, Oakland, Calif.

Application July 2, 1945, Serial No. 602,799

3 Claims. (Cl. 126—288)

The present invention relates to improvements in dampers for fire places, and its principal object is to provide a damper which is simple in construction, adapted for insertion into the throat of a fire place at various angularities, and provided with simple and effective means for operating the lid and for holding the lid in any position to which it may have been adjusted.

More particularly, it is proposed to provide a simple friction means for holding the lid in adjusted position, arranged in such a manner that the friction means can be conveniently adjusted from in front of the fire place by the mere tightening of a nut, at any time during the life of the damper.

It is further proposed to provide a damper of simple construction and arranged in such a manner that it will bear upon the side structure of the fire place at limited areas only, leaving the major portion of the sides of the damper to clear the masonry for accommodation of a suitable filler so as to leave the masonry relatively unaffected by the expansion and contraction of the damper.

Further objects and advantages of my invention will appear as the specification proceeds, and the novel features of my damper will be fully defined in the claims hereto attached.

The preferred form of my invention is illustrated in the accompanying drawing, forming part of this application, in which:

Figure 1 shows a perspective view of my improved damper, viewing it from the front side, approximately as it would appear when installed in a fire place chimney;

Figure 2, a side elevation of the damper as installed in a fire place;

Figure 3, a detail section taken along line 3—3 of Figure 2; and

Figure 4, an enlarged fragmentary side view of the lower portion of the damper.

While I have shown only the preferred form of my invention, it should be understood that various changes or modifications may be made within the scope of the claims hereto attached without departing from the spirit of the invention.

Referring to the drawing in detail, my damper 1 is intended for insertion in the throat of a fire place 2 illustrated in Figure 2, the throat including a rear support 3 spaced from the front wall 4 of the fire place, and a ledge 5 in the front wall which may be two or three bricks above the top of the fire place opening, as indicated at 6.

The rear support 3 is preferably slightly higher than the top of the fire place opening, as shown in the drawing.

My damper comprises in its principal features, a damper frame 7, a swingable lid 8, operating means 9 for the lid, and friction means for holding the lid in adjusted position.

The frame 7 comprises in its preferred form, an upper angle 10, a lower angle 11 and two straps 12 connecting the two angles and holding the same in spaced and parallel relation.

The upper angle has flanges 13 and 14, and the lower angle flanges 15 and 16, and the angle formed between the flanges, in both cases, is somewhat in excess of 90°, possibly about 120°, so that when the flanges 13 and 15 lie horizontally on their respective supports, the frame extends across the throat of the fire place in inclined position, substantially as shown.

The straps 12 are disposed at opposite sides of the frame, and are preferably recessed in their outer edges, as at 17, to clear the masonry through the major portion thereof, the recesses being taken up by a suitable filler, such as rock wool, spun glass, or the like.

Thus the ends of the frame bear upon the brickwork only through limited areas, and the brickwork remains relatively unaffected by expansion and contraction of the frame.

The straps 12 have flanges 18 projecting rearwardly therefrom, and these flanges serve as supporting means for the lid 8, which may be in the form of a flat plate substantially coextensive with the frame opening and formed with a reinforcing flange 19 along the hinged edge thereof.

The lid has journals or shafts 20 projecting from the ends thereof, near the flange 19, and these journals are received in two holes 21 in the flanges 18, the two holes being disposed fairly close to the flanges 15 and 16 of the lower angle.

The spacing of the holes 21 and the journals 20 from the flange 15 is just sufficient to accommodate the bolt 22 and portions of the washers 23 and 24 therein, and the spacing of the holes 21 from the flange 16 is approximately equal to the thickness of the washer 24.

The bolt 22 extends through the flange 16, and the interposed strap 12, and has a nut 25 at the threaded end thereof, the nut appearing on the front face of the lower angle and thus being operable and relatively easy of access from in front of the fire place.

Each journal 20 is confined, in this construction, between the two washers 23 and 24, on one side of the bolt, the two washers assuming angular relationship with respect to one another, and the pressure of the two washers on the interposed journal 20 may be adjusted by operation of the nut 25. The pressure should be made sufficient to hold the journals against turning movement in any position to which they may have been adjusted, while, at the same time, allowing the lid to be adjusted manually. The bolt is preferably squared for a short distance below the head, where it contacts the journal, to prevent the bolt from turning.

The operating means for the lid 8 comprises a lever 30 pivoted to a bracket 31 depending from the upper angle 10 and connected to the lid by means of a link 32.

The pivoted connection consists of a bolt 33 passing through registering holes in the bracket and the link and through a hole in a washer 34, which latter is formed with a flange 35 bearing on the rear edge of the bracket for holding the washer against turning movement.

A nut 36 is threaded upon the threaded end of the bolt, and with both the bracket and the washer held against turning motion, it is apparent that the nut can be readily adjusted to maintain a desired degree of friction on the link sufficient to hold the link in any position to which it has been adjusted. The link is preferably disposed substantially midway of the damper, and is readily accessible for manipulation.

The nut 36 can also be readily reached by means of a suitable tool, for tightening the same, when necessary.

The bracket 31, which is here shown as a relatively short frame member, may be extended vertically across the frame to serve as a bracing member for the latter.

In use, the damper may be readily installed in a new fire place, or in a used one in the manner illustrated in Figure 2.

The handle or lever 30 extends downwardly, intermediate the length of the damper, to a point slightly below the top of the fire place opening and may be readily manipulated by a person standing in front of the hearth.

The friction means at the bolts 22 and 33 will hold the damper lid in any position to which it may have been adjusted, and if either of the friction means should loosen, it may be easily adjusted by tightening of the nuts 25 and 36, both of which are easily accessible.

While the hole 21 is shown, for the sake of clarity, as being slightly larger than the journal 20, it should be understood that in actual construction, the journal has a fairly tight fit in the hole, because the wall of the hole cooperates with the washers 23 and 24 in exerting friction on the journal.

The cut-out end edges of the frame confine the actual contact of the damper frame with the brickwork to a small area, and it is apparent that the contact area may be still further reduced, to come practically to a point, by extending the recess 17 into the inclined flanges 14 and 16 of the two angles 10 and 11.

My damper readily adapts itself for installation into a used fire place for the reason that it may be rocked, within limits, to any position desired.

The washer 24 is preferably made in the form of a ring, circular in cross-section, as indicated in the drawing.

I claim:

1. In a damper for a fire place, a frame adapted for positioning in the throat of a fire place so as to define a flue opening, the frame having a supporting flange along the lower edge of the flue opening and having two spaced side flanges rising therefrom along the side edges of the flue opening, a lid having journals pivoted in the side flanges above the supporting flange and slightly spaced therefrom, a bolt at at least one end between the journal and the supporting flange and passing through the frame, and means on the bolt for exerting pressure on the journal to frictionally oppose rotary movement of the journal, the said means comprising a pair of washers on the bolt bearing on the supporting flange and on opposite sides of the journal and a nut bearing on the frame for tightening the washers upon the journal.

2. In a device of the character described, an angle iron having a horizontal flange and a second flange rising at an angle therefrom, bearing plates mounted transversely upon the second flange at opposite ends of the angle iron, a lid having journals revolvable in said bearing plates and slightly spaced from the flanges of the angle iron, a bolt at at least one end between the journal and the horizontal flange and passing through the second flange, and means on the bolt for exerting pressure on the journal to frictionally oppose rotary movement of the journal, the said means comprising a pair of washers on the bolt bearing on the first flange and on opposite sides of the journal, and a nut bearing on the second flange for tightening the washers upon the journal.

3. In a device of the character described, an angle iron having a horizontal flange and a second flange rising at an angle therefrom, a bearing plate mounted transversely upon one of said flanges, a lid having a journal in said bearing plate and slightly spaced from the flanges of the angle iron, a bolt between the journal and the horizontal flange and passing through the second flange, a pair of washers on the bolt bearing on the first flange and on opposite sides of the journal, and a nut bearing on the second flange for tightening the washers upon the journal.

AUGUST J. MILLER.

REFERENCES CITED

The following references are of record in the file of this patent:

UNITED STATES PATENTS

| Number | Name | Date |
|---|---|---|
| 1,033,582 | Harris | July 23, 1912 |
| 1,047,434 | Myers | Dec. 17, 1912 |
| 1,175,560 | Rixson | Mar. 14, 1916 |
| 1,422,465 | Morrell | July 11, 1922 |
| 1,636,250 | Setchfield | July 19, 1927 |
| 2,174,888 | Klann | Oct. 3, 1939 |
| 2,207,291 | Hedstrom | July 9, 1940 |
| 2,275,493 | Benjamin | Mar. 10, 1942 |
| 2,345,997 | Anderson | Apr. 4, 1944 |
| 2,350,441 | Anderson | June 6, 1944 |